United States Patent [19]

Tull

[11] 4,117,631
[45] Oct. 3, 1978

[54] POTTED PLANT WATERING MEANS

[76] Inventor: Steven L. Tull, 17424 Strathern, Northridge, Calif. 91324

[21] Appl. No.: 796,140

[22] Filed: May 12, 1977

[51] Int. Cl.² ............................................. A01G 27/00
[52] U.S. Cl. ...................................................... 47/81
[58] Field of Search ..................... 47/48.5, 66, 70, 71, 47/72, 78, 80, 81, 82, 83, 59–64; 137/236; 239/327, 328; 150/0.5

[56] References Cited

U.S. PATENT DOCUMENTS

| | | | |
|---|---|---|---|
| 2,747,332 | 5/1956 | Morehouse | 47/81 |
| 2,870,574 | 1/1959 | Sheridan | 47/62 |
| 3,052,063 | 9/1962 | Dunn | 47/81 |
| 3,069,807 | 12/1962 | Wall | 47/81 |
| 3,109,258 | 11/1963 | Jensen | 47/48.5 |
| 3,304,653 | 2/1967 | Zadarnowski | 47/48.5 |
| 3,691,004 | 9/1972 | Werner et al. | 428/296 |
| 3,857,196 | 12/1974 | Alkire | 47/48.5 |
| 3,866,352 | 2/1975 | Herveling et al. | 47/81 |
| 3,881,873 | 5/1975 | Klowden | 47/48.5 X |
| 4,037,361 | 7/1977 | Murphy et al. | 47/48.5 |

FOREIGN PATENT DOCUMENTS

| | | | |
|---|---|---|---|
| 1,301,913 | 7/1962 | France | 47/81 |
| 1,581,467 | 8/1969 | France | 47/81 |
| 837,332 | 7/1949 | Fed. Rep. of Germany | 47/81 |
| 582,985 | 12/1976 | Switzerland | 47/48.5 |
| 1,147,851 | 4/1969 | United Kingdom | 47/81 |
| 1,292,802 | 10/1972 | United Kingdom | 47/48.5 |

Primary Examiner—Edgar S. Burr
Assistant Examiner—James R. Feyrer
Attorney, Agent, or Firm—Georges A. Maxwell

[57] ABSTRACT

A well and wick type watering device for engagement in the bottom of a flower pot, including a formable container with flexible walls defining a water supply chamber, an elongate vertical tubular neck with a lower end communicating with the container and an open upper end above the top surface of the soil deposited in the pot above the container, an elongate wick with an inner portion in the chamber and an outer portion extending upwardly into said soil and support means in the container to support the overburden of soil above the container and to maintain adjacent and opposing portions of the chamber defining flexible walls in spaced relationship.

10 Claims, 6 Drawing Figures

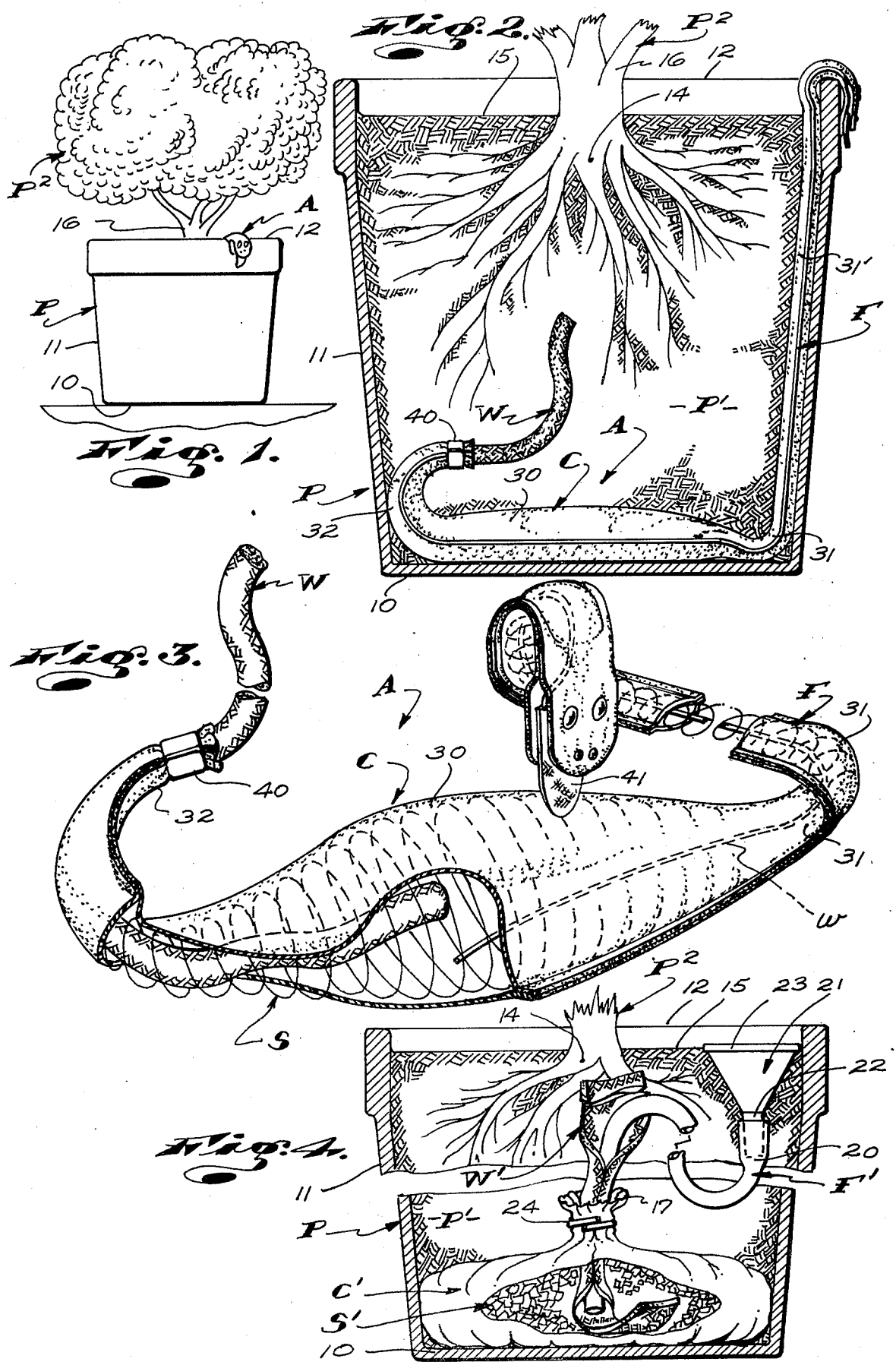

POTTED PLANT WATERING MEANS

This invention has to do with a watering device and is more particularly concerned with an improved well and wick type watering device for potted plants.

THE PRIOR ART

In the art of culturing plants in containers or pots, it has long been recognized that watering or providing and maintaining the proper moisture in the soil within the pots and about the roots of plants growing therein is most important and oftentimes most difficult to achieve.

One of the most effective and satisfactory means for maintaining a desired and proper moisture level in soil within plant containers or pots, in which plants are growing, includes elongate wicks arranged within the soil in the pots or containers and having ends extending from within the soil into reservoirs or supplies of water. With such means, the soil absorbs water from the wick, which water is drawn from the reservoir or supply of water by the wick. Such means have the marked advantage of providing a substantially constant supply of water for the plants growing in the soil, without overwetting or saturating the soil with water and creating conditions which are adverse to effective plant culture.

The above noted class of means, while serving to prevent dehydration of plants, also prevent dehydration of the soil in the pots with which they are related. While dehydration of the soil in pots is often given little consideration or is viewed as a matter of secondary importance, it is in fact of primary importance since it often happens that once the soil in a pot has been permitted to dehydrate, it will not become effectively moistened throughout its mass upon subsequent applications of water in a normal manner. For example, if the soil in a pot becomes dehydrated, it generally shrinks in volumetric extent and separates or parts from the inside surface of the pot. When water is next deposited in the pot, on top of the soil, the water tends to flow directly downwardly between the soil and the pot and thence out of the pot through a drain opening or openings in the bottom of the pot. When this takes place, the soil is not effectively wetted and the plant growing therein becomes dehydrated and is likely to die.

As a result of the foregoing, it is not infrequent that people not aware of the fact that the soil in which their potted plants are growing has become dehydrated, will water their potted plants regularly and in a manner which is calculated to provide the plants with adequate moisture, only to see the plants wither and die from lack of moisture.

With the above noted well and wick type watering means, the supply of water in the wells can, as a rule, be effectively monitored, whereby a constant supply of water can be maintained and dehydration of the soil in the pot can be avoided. Further, if the supply of water should become exhausted and the soil should become dehydrated, upon replenishing the supply of water, the wick will effectively conduct water into the soil, slowly and over a sufficiently protracted period of time, whereby the soil can and will absorb the water and become properly moistened once again.

Another advantage and feature of the above noted well and wick type watering means resides in the fact that the wells of such means are such that they can hold a substantial supply of water, whereby the task of watering the plants with which such means are related can be made a weekly or bi-monthly task rather than a day to day task. In some instances where the ambient atmosphere is cool and moist, the means here provided have maintained proper moisture levels in potted plants for several months without replenishing the water supply.

The several advantages afforded by wick and well type watering means noted above are but selected examples from a multitude of advantages such means afford.

The structural embodiments of wick and well type watering means provided by the prior art have varied widely in construction. One typical form of such means includes a reservoir type platter or dish in which a pot is set, an elongate wick engaged through an opening in the bottom of the pot, with a lower or outer end portion engaged in a supply of water in the platter or dish and an upper end portion engaged in the soil in the pot. Such means, while effective, are not readily adaptable to ordinary or common flower pots and require the construction and provision of special pots and reservoir type platters.

Further, the above noted form of well and wick type watering means is such that the supply of water in the platters is exposed to atmosphere and is such that it frequently evaporates at a rate that necessitates constant monitoring of the water supply and frequent replenishing of that supply.

The most effective well and wick type watering means or device provided by the prior art consists of rigid vessels or water containers adapted to be arranged within and at the bottom of related flower pots. The containers are provided with openings in their tops through which wicks extend to conduct water from within the containers into soil within the pots and above the containers. Finally, the structures include elongate, substantially vertical, upwardly extending filler pipes projecting upwardly from the containers, through the soil in the pots and to the upper open ends of the pots where they are readily accessible to receive water, when replenishing of the supply of water in the containers is required.

This last noted well and wick type watering means are considered desirable since they are arranged substantially wholly within related pots and are obscured from view. Further, such means do not require the establishment of special pots, platters and the like and are such that they can be related to substantially any pot which is big enough to accommodate them. Still further, the supply of water in the containers in such devices is effectively enclosed so that little or no loss of supply water can take place by evaporation.

The principal shortcomings to be found in the last noted form of well and wick type watering means or devices resides in the fact that they are rigid structures of predetermined fixed dimensions and are such that they can only be effectively related to pots which are of a size and shape which is compatible with the size and shape of the devices. For the most effective and beneficial use of such devices, the pots with which they are to be related should be made especially to receive and accommodate the devices or, a multitude of different sizes and shapes of such devices must be provided to effectively fit in the multitude of different sizes and shapes of pots with which they might be related.

The above requirements are such that this noted form of watering means is not commercially practical or feasible and has failed to attain any notable commercial success.

A notable shortcoming in the above prior art means resides in the fact that the rigid water containers engage on the bottom of and extend vertically upwardly within their related pots to occupy the interior portions of the pots which should be left available for the effective growth of the root systems of plants growing in the pots.

An object and feature of my invention is to provide an improved well and wick type watering means for potted plants which is such that it is readily and easily conformable to the inside configuration of a related pot.

Another object and feature of the invention is to provide a watering means or device of the character referred to above which is such that it can be effectively engaged in and related to a multiplicity of different sizes and shapes of pots and is such that it can be effectively formed so as not to obstruct or interfere with the free, effective and desired growth of the root systems of plants growing in the pots.

Still another object and feature of this invention is to provide a watering means of the character referred to which includes a water container defined by a flexible wall structure, support means within the container to support and hold the portions of the wall structure in spaced relationship and prevent collapsing of the container by an overburden of soil, an elongate wick having an inner end within the container and an outer end projecting from the container and an elongate substantially vertical filler neck with a lower end communicating with the container and an upper end accessible at the top of the related pot.

Yet another object and feature of the present invention is to provide a watering device of the character referred to wherein said support means includes; a semi-flexible and formable helical member; a porous semi-flexible formable mass of fibres or filaments; a loose porous mass of irregular granular material, such as gravel or charcoal; or, a combination of two or more structural means of the nature and/or character noted above.

It is an object and feature of this invention to provide a structure of the general character referred to wherein the filler neck is an elongate flexible part or portion formed integrally with and extending from the container or is an elongate tubular part cooperatively related to the container to communicate with the interior thereof.

It is another object of this invention to provide a watering means of the character referred to wherein the support means within the container extends through the filler neck to prevent collapsing and closing of the neck by a burden of soil at the exterior of said neck.

It is an object and feature of this invention to provide a watering means or device of the character referred to wherein the wick is an elongate length of common wick stock (of cotton or the like) of desired cross-sectional configuration and extent.

It is another object and feature of the present invention to provide a watering device of the character referred to which is such that it readily lends itself to aesthetic embellishment which will enhance its marketability and make its use more desirable and pleasing.

Yet another object of my invention is to provide a structure of the general character referred to above wherein said filler neck has an upper portion which is unsupported by the support means and which is such that it can be folded closed and engaged in hooked or draped relationship over the rim of a related pot for easy and convenient access thereto to effect opening of the neck and to facilitate replenishing the supply of water within the container.

Finally, it is an object of this invention to provide a watering means of the character referred to including means for indicating when the supply of water in the container is exhausted.

The foregoing and other objects and features of my invention will be understood and will become apparent from the following detailed description of typical preferred forms and applications of the invention throughout which description reference is made to the accompanying drawings in which:

FIG. 1 is an elevational view of a flower pot to which my invention relates;

FIG. 2 is an enlarged sectional view of the structure shown in FIG. 1;

FIG. 3 is an enlarged detailed view of the watering device that I provide with portions broken away to better illustrate details of the construction;

FIG. 4 is a sectional view of a flower pot with another form of the invention to which it relates;

DESCRIPTION OF THE INVENTION

Figure 5:
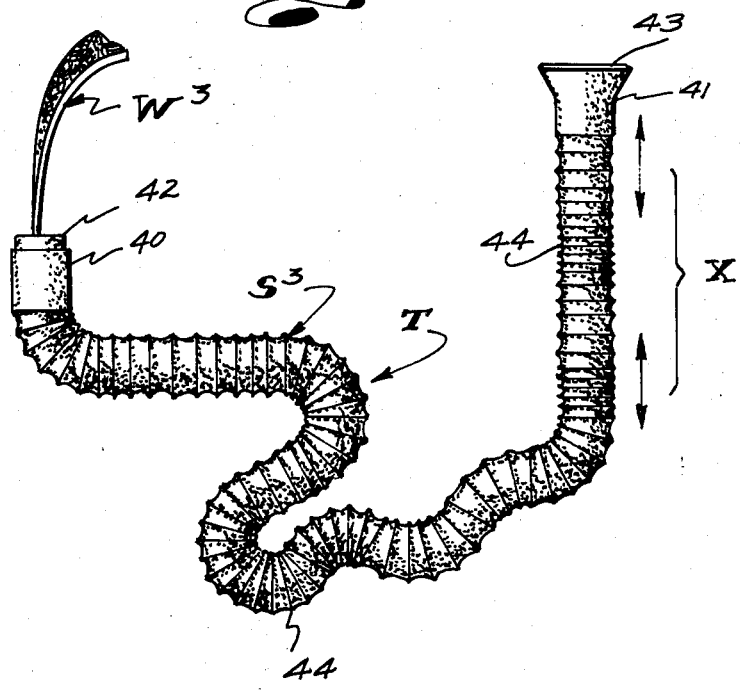
FIG. 5 is an elevational view of another form of the invention.

The watering means or device A that I provide is adapted to be related to a flower pot P having a flat bottom 10 and an upwardly projecting cylindrical side wall terminating at its upper limits to define a rim 12. The pot P is filled with potting soil P' to near its rim 12 and a plant $P^2$ is arranged substantially centrally of the pot with its root system 14 extending downwardly and outwardly in the soil P', from the surface 15 of the soil and with its trunk or stock 16 extending upwardly from said top surface 15 of the soil.

In practice, the pot P can vary widely in size and configuration but commonly is an upwardly opening container structure defined by a bottom, side walls, and a rim.

The watering means A includes generally, a flexible container C, support means S within the container, an elongate wick W with inner and outer end portions within and outside the container and an elongate, vertical, filler means or neck F for conducting water into the container.

In FIGS. 1, 2 and 3 of the drawings, I have shown the means A in a form of embodiment suitable for mass production and commercial exploitation; while in FIG. 4 of the drawings, I have shown the means A' in a simple and/or basic form which lends itself to limited production and sale of the invention.

In the form of the invention shown in FIG. 4 of the drawings, the container C' is established of a simple, flexible plastic bag with a normally open upper mouth portion 17. The support means S' within the bag includes a loose, porous mass of fibrous material, such as plastic wool, or granular material such as charcoal, interconnected cellular plastic foam, gravel, or the like. The means S is such that it holds and supports opposing wall portions of the container in spaced relationship, prevents the container from collapsing and, at the same time, permits molding or changing the exterior configuration of the container, as desired, or as circumstances require.

The support means S is such that the volumetric extent of its material mass is substantially less than the volumetric area of space that means occupies whereby a substantial volume of water can be held in the container and within the voids and interstices defined by said support means.

In practice, granular charcoal is a suitable material for the support means since it serves to purify water within the container and prevents or inhibits the water from becoming sour.

Another suitable and preferred material for establishing the support means is plastic wool, that is, that form of intermixed or intertwined semi-flexible plastic filament material such as is commonly used to make scouring pads for kitchen use and the like.

Such plastic wool has an extremely large ratio of void to material and is such that it will accommodate a large volume of water.

The container C' is arranged in supported engagement or position on the bottom 10 of a related pot P and is urged downwardly and outwardly to extend radially and into substantial conformation in and with the bottom or lower end of the pot, substantially as illustrated.

The filler means or neck F' includes an elongate length of flexible plastic or rubber tubing 20 with a lower inner end portion depending through the upwardly opening mouth of the container and an upper outer end portion extending upwardly from the container. The means F next includes a funnel 21 with a lower neck portion 22 engaged with the upper end of the tube 20 and an upwardly divergent end upwardly opening cup 23.

The wick W' is a flat, flexible ribbon-like length of braided cotton or the like with a lower end portion extending into the lower portion of the container, a central portion extending through the mouth defining portion of the container and an upper portion projecting upwardly and freely from the top of the container.

In the case illustrated, the mouth portion of the container is gathered and closed about the wick W' and the tube 20 of the means F' and is held in snug, substantial sealed engagement thereabout by means of a tie string, twisted wire, or by a metal clip 24, as clearly illustrated in the drawings. In practice, and as illustrated, the central portion of the wick, occurring within the confines of the clip 24 is formed or wrapped about the tube to provide a neat assemblage and to assure the establishment of a substantially leak-proof seal between the upper mouth defining portion of the container and the wick and between the wick and the tube of the means F radially inward of the clip 24.

In practice, the container C' is arranged substantially centrally in a related pot P in seated engagement on the bottom 10 thereof, with its upper mouth portion at its top. The container C is then manually pressed and urged downwardly and radially outwardly in the pot to mold and form it into conforming engagement with the bottom and/or lower interior of the pot and so that it projects upwardly in the pot a minimum extent and occupies a minimum of valuable plant growing space within the pot, above the bottom thereof.

Next, planting soil P' is deposited in a pot above the container. As the soil is deposited in the container, the wick W is drawn upwardly to extend through the soil and the tube 20, with the funnel 21 at its upper end, are drawn and moved upwardly and laterally so that the upper rim portion of the funnel 21 is at or slightly above the top surface 15 of the soil, when the desired volume of soil is deposited in the tank. The tube and funnel of the means F' are moved radially so that they occur within the pot in radial spaced relationship from the central portion thereof and occur adjacent one side of the pot.

With the means A' thus related to the pot P and in the soil in the pot, it will be apparent that the container can be filled with water by pouring water into the open upper end of the funnel 21 and that the wick W' slowly conducts such water from the container C' into the soil in the pot and effectively maintains the soil moist. As the moisture in the soil evaporates or is drawn therefrom by the plant $P^2$ growing therein, the wick W serves to replenish such lost moisture in the soil with water from within the container.

In the form of the invention shown in FIGS. 1, 2 and 3 of the drawings, the container C is an elongate tubular structure with an enlarged central portion 30 and longitudinally outwardly convergent front and rear end portions 31 and 32 with open outer ends.

The container C is established of a pair of suitably formed sheets of flexible plastic film material, such as polyvinylchloride. The formed sheets are arranged with their related edges in juxtaposition with each other and are suitably welded together.

The filler means F is established by an elongate flexible tubular neck-like extension 31' of the front end portion of the container, as clearly shown in the drawings.

The support means S in this form of the invention is shown as including an elongate helically formed semi-resilient and malleable or plastic metal wire or plastic filament.

The helically formed support means normally conforms in longitudinal and cross-sectional configuration with the interior longitudinal and cross-sectional configuration of the container C when the container is in a fully extended condition. That is, when the container is in that condition and/or shape it would assume if it were fully extended or inflated by a fluid medium.

In practice, and as shown in the drawings, the means S is extended longitudinally forwardly to extend longitudinally through the tubular neck 31' of the means F.

It is to be noted and understood that the means S illustrated and described above is but one form of support means that can be advantageously employed and that any support means, such as plastic wool, granular charcoal or plastic and the like could be substituted for the means S without departing from the spirit of this invention.

The wick W is an elongate length of flexible wick stock with front and rear end portions and is engaged through the open rear end of the container C so that its front end portion extends well into the container and so that its rear end portion extends freely outwardly from the rear end of the container. The rear end of the container is held in snug, clamped and substantially sealed engagement about the wick by means of a clamp ring 40.

The forward free end of the filler tube or neck of the means F is preferably unsupported by the support means and is left free to collapse or fold so as to effectively close the outer free end of the neck.

In practice, and in use, the central portion of the container C is urged downwardly in a related pot P and into supported engagement with the bottom 10 thereof. The container C is urged downwardly and radially so as to conform with the lower interior portion of the pot. The wick W and the rear end portion of the container C are preferably drawn and turned upwardly so that the rear end of the container is above the uppermost limits of the central portion of the container whereby the possibility of water within the container leaking freely therefrom at the rear end thereof and about the wick is prevented.

When the container is thus positioned in the pot, the filler tube or neck of the means F is drawn upwardly and urged radially outwardly into juxtaposition with the inner side of the pot and with its upper free end extending upwardly and/or beyond the rim of the pot. The upper free end of the neck is unsupported by the means S and is normally turned and/or folded radially outwardly and downwardly into hooked and/or draped relationship over the rim of the pot, whereby the upper end of the neck is suitably closed and so that said upper end of the neck is freely accessible and manually engageable for the purpose of opening said upper end of the neck and introducing water therein.

With the above structure thus engaged in the pot, the pot is filled with potting soil P' and the soil is suitably compacted therein above the container C, about the wick W, and against and/or about the neck of the means F.

It is to be particularly noted that the helically wound support means S is axially resilient and such that it can yield to forces applied axially of the construction whereby the container and/or the neck can be accordioned and collapsed axially to establish desired engagement in the pot and the soil in the pot. Such axial adjustment affords effective fitting and arranging of the invention in pots of many different sizes and shapes.

When the soil is deposited and compacted in the pot, as noted above, the support means S effectively supports and prevents the container and the filler neck from being collapsed.

In furtherance of my invention, the upper outer end of the neck 31 of the means F which is hooked or draped over the rim 12 of the pot P, and which is visible and accessible at the exterior of the pot, can be formed and embellished with beads or the like, to resemble a flower or, for example, the head of some of some fanciful creature such as is shown in the drawings.

Finally, the watering means A that I provide can include indicating means I to indicate when the supply of water in the container is exhausted. The means I, in the preferred carrying out of the invention, includes an elongate wick w of small cross-section extending from the bottom of the central portion of the container C outwardly through the neck 31' of the means F to the outer or free open end thereof. The outer end of the wick w contacts and/or is connected with a colored ceramic bead or cloth patch which is light in color tone when dry and which is dark in color tone when wet or moist. The colored ceramic or fabric element or part can be advantageously employed to embellish the design imparted into the outer free end of the neck.

In the case illustrated, the colored part or element is established by a fabric patch 41 and is formed and related to the end of the neck to resemble the tongue of the fanciful creature.

As long as a supply of water remains in the container C, the wick w conducts sufficient water to the patch 41 to keep it moist and dark in color tone. When the supply of water is exhausted, the patch dried and its color tone lightens, thus signalling that the supply of water has been exhausted and must be replenished.

In practice, the wick w could be replaced by a flexible plastic capillary tube, without departing from the spirit of this invention.

In the forms of the invention described in the foregoing, the support means S has been a separate supporting structure arranged within the container or in the container and neck. While a support means of that nature is effective and might be preferred in certain instances, it will be apparent and it is to be understood that a support means can be formed integrally in the flexible wall structure defining the container and neck.

For instance, it will be apparent that the helical support means 8 in the form of the invention shown in FIGS. 1, 2 and 3 of the drawings can be established of a suitable plastic and can be welded or fused with its adjacent flexible plastic walls to become an integral part thereof.

Alternatively, the wall structure of the device can be a laminate structure with inner and outer layers and the helical support means S can be arranged between the layers without departing from the spirit of this invention.

Figure 6:
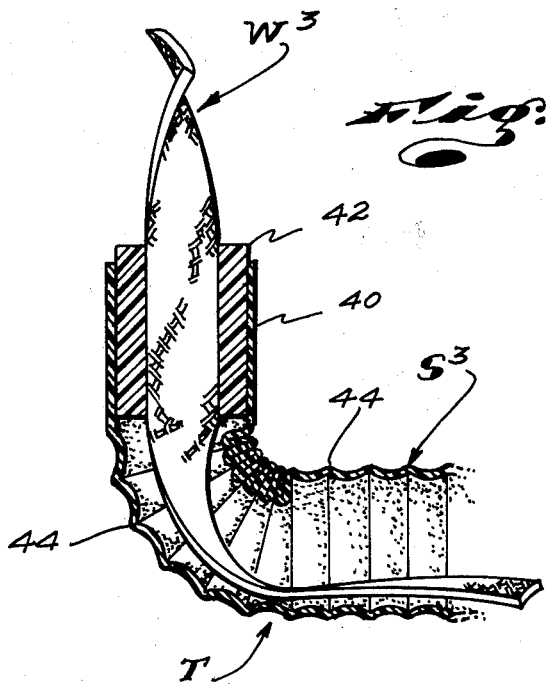
FIG. 6 is a sectional view of a portion of the structure shown in FIG. 5.

In FIGS. 5 and 6 of the drawings, I have shown another embodiment of my invention wherein the support means $S^3$ is incorporated in the flexible wall structure of the device.

The last form of the invention is established of a length of flexible plastic tubing T having open inner and outer ends 40 and 41. The inner end portion of the tube is normally turned to project vertically upwardly. The inner end 40 is sealed by a plastic plug 42 having an opening through which a wick $W^3$ is substantially sealingly engaged. The wick $W^3$ has one end portion extending freely axially outward from the inner end of the tube and another end portion extending axially into the interior of the tube. The outer end portion of the tube establishes a filler neck and is normally turned to project vertically upwardly. The outer end 41 of the tube can be flared to establish an upwardly opening funnel as shown at 43.

The support means $S^3$ is substantially coextensive with the tube and comprises a multiplicity of annular corregations 44 formed in the flexible wall of the tube. The corregations are such that they enhance the lateral flexibility of the tube and impart axial flexibility whereby the overall longitudinal or axial extent of the tube can be increased or decreased and whereby any desired portion of the tube can be lengthened or shortened, axially, as circumstances require and as indicated by the bracketed arrows X in FIG. 5 of the drawings. In addition to the above, the corregations 44 of the means $S^3$ imparts substantially and adequate radial stiffening and structural support to prevent collapsing of the tube by a burden of potting soil about the exterior thereof.

The portion of the tube between the upwardly turned end portions defines the reservoir or container portion of the construction and is such that it can be coiled or othewise arranged and/or laid on the bottom of a related flower pot.

While it is preferred that the tube T be established of a suitable plastic material, it can be established of a suitable soft, flexible and formable metal such as copper or aluminim.

In practice, standard, metallic, corregated flex-tubing such as is commonly used to connect gas cooking ranges, water heaters and the like with gas service outlets can be advantageously used to establish this last form of my invention.

In all other respects, this last form of the invention is essentially the same as are the two previously described forms of the invention.

From the foregoing, it will be apparent that the improved well and wick type watering means or device the I provide is a novel device embodying the unique capability of being moldable to conform with the interior of a related pot, whereby the device can be advantageously related to a multitude of different sizes and shapes of pots. When engaged in and related with a pot, it affords minimum obstruction to the development and growth of the root structure of a plant growing in soil deposited in the pot, above the container portion of the device.

Having described only typical preferred forms and applications of my invention, I do not wish to be limited to the specific details herein set forth, but wish to reserve to myself any modifications and/or variations that may appear to those skilled in the art and which fall within the scope of the following claims.

Having described my invention, I claim:

1. A well and wick type watering device for engagement in the bottom of a flower pot having a bottom, vertical sides and an upper rim and in which soil is deposited; said device including a formable container arranged in and conforming to a lower portion of the pot beneath the soil therein and having flexible walls defining a water supply chamber, an elongate substantially vertically extending tubular neck with a lower end communicating with the container and an open upper end arranged above the top surface of the soil in the pot, an elongate wick with a lower inner portion in the lower portion of the chamber defined by the container, a central portion engaged through the container in substantial sealed engagement therewith and an upper outer end portion extending upwardly into said soil and support means in the container to support the overburden of soil above and acting upon the container and to maintain adjacent and opposing portions of the chamber defining flexible walls in spaced relationship.

2. The watering device set forth in claim 1 wherein said support means includes a fluid mass of granular material in bridging contact and defining water receiving spaces and interstices.

3. The watering device set forth in claim 1 wherein said support means comprises spaced corregations formed in said flexible walls.

4. The watering device set forth in claim 1 wherein said support means is a formable loose mass of semi-flexible and formable material.

5. The watering means set forth in claim 1 wherein said support means comprises helically formed resilient and formable filaments in yielding supporting engagement with said walls.

6. The watering device set forth in claim 1 wherein said tubular filler neck is flexible.

7. The watering means set forth in claim 1 wherein said tubular filler neck is flexible and formable and wherein said support means extends longitudinally through said neck.

8. The watering device set forth in claim 7 wherein said support means includes a fluid mass of granular material in bridging contact and defining water receiving spaces and interstices.

9. The watering means set forth in claim 7 wherein said support means comprises helically formed resilient and formable filaments in yielding supporting engagement with said walls.

10. The watering device set forth in claim 1 which further includes indicating means to signal when a supply of water in the container is exhausted, said indicating means including an elongate indicator wick extending from the chamber and longitudinally through said neck and a colored signalling part visibly positioned at the open end of the neck and connected with said indicating wick, said part being such that its color tone is notably different when it is moist than when it is dry.

* * * * *